H. PITCHER.
Boring Machines.

No. 138,927. Patented May 13, 1873.

UNITED STATES PATENT OFFICE.

HIRAM PITCHER, OF FOND DU LAC, WISCONSIN.

IMPROVEMENT IN BORING-MACHINES.

Specification forming part of Letters Patent No. 138,927, dated May 13, 1873; application filed February 8, 1873.

*To all whom it may concern:*

Be it known that I, HIRAM PITCHER, of Fond du Lac, county of Fond du Lac and State of Wisconsin, have invented certain new and useful Improvements in Boring-Machines, of which the following is a specification:

The nature of my invention relates to the construction of a boring-machine; and consists in a number of driving-wheels, keyed in any suitable manner to the driving-shaft, and which operate the boring devices by means of the pinions secured thereto. The bearings, in which the boring devices are journaled, and the driving-wheels upon the shaft, are all attached to shifting-levers so that they can be drawn nearer together, or spread apart, to change the space between the borers at will. It also consists in adjustable rings, which can be so arranged upon the hand-lever that the borers can be made to operate at equal or unequal distances apart, as may be desired.

Figure 1:
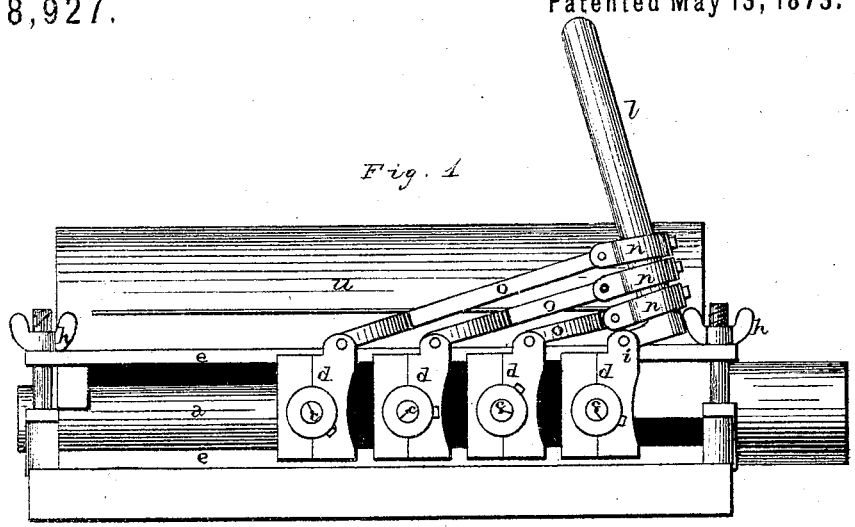
Figure 2:
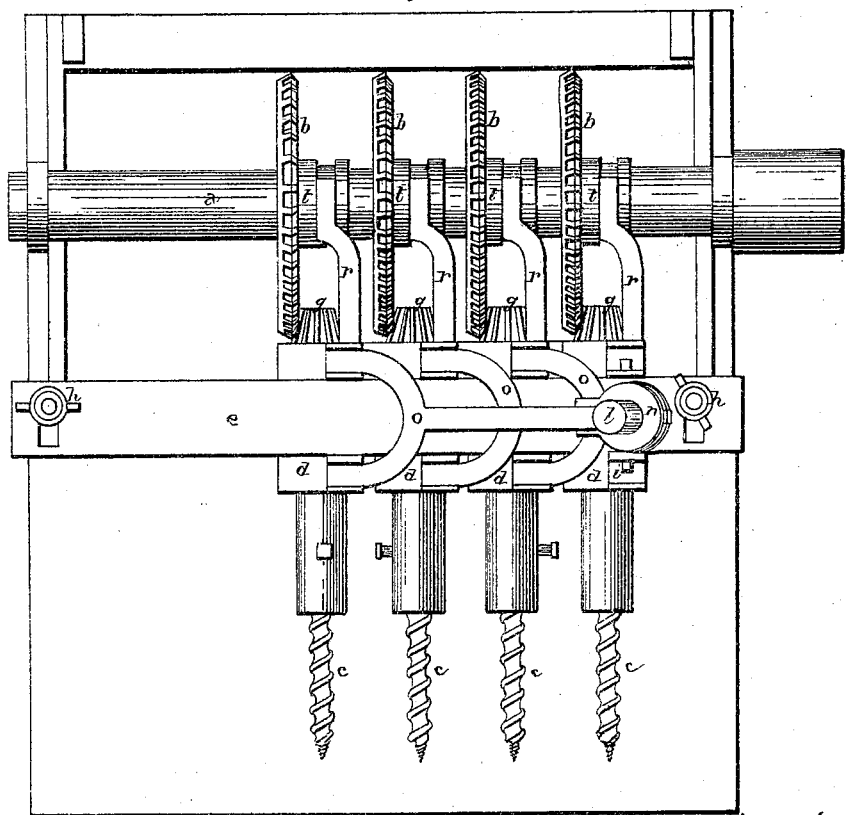

Figure 1 represents a side elevation of my invention. Fig. 2 is a plan view of the same.

$a$ represents the driving-shaft, upon which are feathered a number of driving-wheels, $b$, in such a manner that they can be readily shifted back and forth, the feather being upon the shaft to extend into the wheels or upon the wheels to extend into the shaft. The boring devices $c$, which may be of any suitable kind, are journaled in adjustable bearings $d$, which slide back and forth in the ways $e$, and which have pinions $g$ secured to their heads to mesh with the driving-wheels. The upper way is slotted at each end and secured in place by the thumb-screws $h$ to be readily adjusted. Pivoted to the top of the stationary bearing $i$, or to any other suitable base, is a hand-lever, $l$, over which is slipped an adjustable ring for each movable bearing, and to each ring $n$ is pivoted a forked shifting-lever, $o$, to connect them to the movable bearings $d$. Extending back from each bearing $d$ is an arm or clutch, $r$, which, catching in a groove cut in the periphery of the collars $t$, secured to the wheels, bind the driving-wheels and the bearings together, so that when one is shifted back or forth the other moves also, always keeping the same relative position.

By shifting the rings $n$ up or down upon the lever $l$, nearer to or farther from the center of motion, and by moving the lever forward or back, the bearings $d$ will be moved at unequal distances apart. By this arrangement the borers may be made to work at equal or unequal distances from each other, as may be required.

Over the driving-shaft and wheels is placed the hinged cover $u$ to protect them from chips and dust.

By lengthening or shortening the forked levers $o$ the distance between the bearings for the boring devices can be changed in the same manner as by changing the positions of the adjustable rings $n$.

Having thus described my invention, what I claim as new, and desire to secure by Letters Patent, is—

1. The combination of the movable driving-wheels $b$ and movable bearings $d$, substantially as set forth, when connected together as described.

2. The combination of the lever $l$, adjustable rings $n$, and the movable bearings $d$, and forked levers $o$, so that the borers can be made to work at equal or unequal distances apart, substantially as shown and described.

3. The shaft, driving-wheels, pinions, adjustable bearings, forked levers, and adjustable rings, when all are combined to operate as set forth.

In testimony that I claim the foregoing as my invention I hereunto affix my signature this 4th day of February, 1873.

HIRAM PITCHER.

Witnesses:
    J. A. HAZARD,
    JOHN H. GIDDINGS.